(12) United States Patent
Ghisleri (10) Patent No.: US 7,552,859 B2
(45) Date of Patent: Jun. 30, 2009

(54) DEVICE FOR AUTOMATIC READING OF A PLURALITY OF CODES BY MEANS OF A SINGLE KEY CODE

(75) Inventor: Pier Francesco Ghisleri, Asola (IT)

(73) Assignee: Radar Di Ghisleri Pier Francesco & C.S.N.C., Asola (IT)

( * ) Notice: Subject to any disclaimer, the term of this patent is extended or adjusted under 35 U.S.C. 154(b) by 622 days.

(21) Appl. No.: 10/517,785

(22) PCT Filed: Dec. 13, 2002

(86) PCT No.: PCT/IT02/00790

§ 371 (c)(1),
(2), (4) Date: Jul. 20, 2005

(87) PCT Pub. No.: WO03/105110

PCT Pub. Date: Dec. 18, 2003

(65) Prior Publication Data

US 2006/0049241 A1    Mar. 9, 2006

(30) Foreign Application Priority Data

Jun. 11, 2002    (IT)    .......................... MI2002A1290

(51) Int. Cl.
*G06C 27/00*    (2006.01)

(52) U.S. Cl. ................................ 235/117 R; 235/60.15
(58) Field of Classification Search ................. 235/494, 235/1 C, 60.15, 60.16, 117 R
See application file for complete search history.

(56) References Cited

FOREIGN PATENT DOCUMENTS

DE            107 347 C       12/1899
GB            187 312 A       10/1992

OTHER PUBLICATIONS

International Search Report for International Application No. PCT/IT02/00790 dated May 19, 2003.

*Primary Examiner*—Karl D. Frech
(74) *Attorney, Agent, or Firm*—Hogan & Hartson LLP (57) ABSTRACT

A device for the automatic reading of a plurality of codes by means of a key code exceptionally suitable for maintaining a plurality of codes secret and making them available with the introduction of a key code, comprises a plurality of drums adapted to rotate around an axis and a plurality of inserts provided with visible faces suitable for carrying distinctive elements. The inserts are connected in a movable manner along the side edge of each of the said drums to form strings. The drums can be place side by side in an axial direction in order to align all the distinctive elements of a plurality of drums and are inserted on a rod that includes a first stop fixed to one end of the rod itself. A second stop is fixed to the opposite end and locked on the rod.

55 Claims, 8 Drawing Sheets

DEVICE FOR AUTOMATIC READING OF A PLURALITY OF CODES BY MEANS OF A SINGLE KEY CODE

FIELD OF THE INVENTION

The present invention concerns a device for automatic reading of a plurality of codes by means of a single key code.

More particularly, the invention refers to a device for example, in the form of a key ring or desk accessory or some similar item inside which it is possible to enter access codes for mobile phones, automatic bank distributor cards, credit cards, etc.

BACKGROUND OF THE INVENTION

It is well known that the use of computerised and/or electronic systems requires an increasing number of alphanumeric and/or word key codes for access to the services in question.

Certain examples of this type of code are those used for phone cards, automatic bank distributor cards, or credit cards. These can also include codes and combinations for safes or safety boxes, access codes to Internet sites or to burglar alarm systems.

It is obvious that the user must remember a certain number of alphanumeric codes than, for security reasons, cannot be written anywhere that can be easily read by others. The difficulty in remembering all these essential alphanumeric codes is obvious, and in addition this problem is increased by the fact codes need to be changed regularly for security reasons.

The facts stated above demonstrate the need for a device that can contain all the secret codes without making the codes themselves immediately visible, and that can make all necessary codes available by simply entering and remembering a single key code.

The basic problem in relation to the present invention is to provide a device for the automatic reading of a plurality of codes through a single key code, and whose structural and functional characteristics are able to satisfy said needs.

SUMMARY OF THE INVENTION

This problem can be solved by a device for automatic reading of a plurality of codes through a single key code as described in claim 1.

BRIEF DESCRIPTION OF THE DRAWINGS

Further characteristics and advantages provided by this device for automatic reading of a plurality of codes by means of a single key code according to this invention will be easily understood from the following description including preferred embodiment examples which are indicative but by no means limiting, with reference to the attached drawings wherein.

DETAILED DESCRIPTION OF THE INVENTION

With reference to these figures, the number 10 identifies the device for the automatic reading of a plurality of codes by means of a key code.

Figure 1:
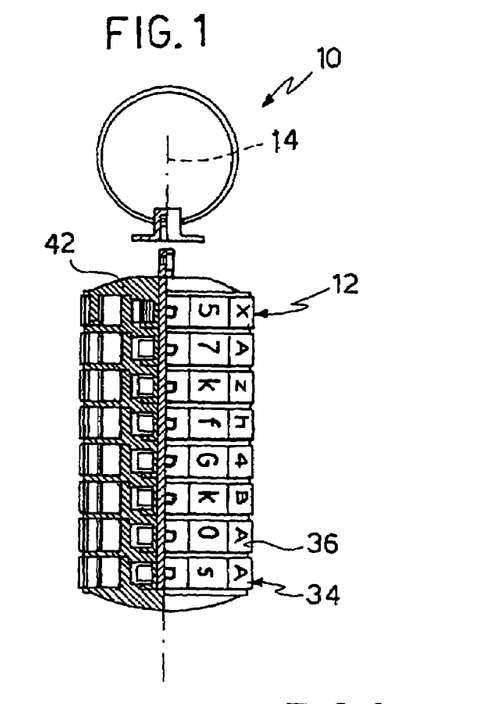
FIG. 1 illustrates a partial cross section side view of a device according to this invention.
Figure 2:
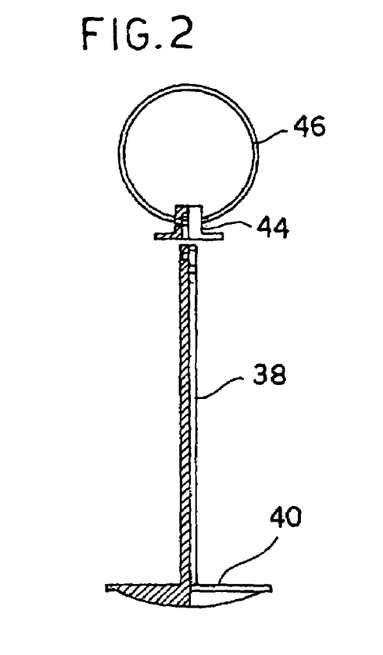
FIG. 2 illustrates a partial cross section side view of a detail of the device illustrated in FIG. 1.

According to the example of embodiment illustrated in FIG. 1, the device in question can, for example, assume the shape and size of a key ring or an accessory for application on a computer monitor or on an office desk, and can contain a set of drums 12 suitable for rotating around a longitudinal axis 14.

In the example shown in FIG. 1, eight drums have been foreseen, to be aligned alongside each other in the direction parallel to the axis 14.

An example of the embodiment of a drum 12 is illustrated in FIGS. 5-9 and comprises a disk shaped plan 16 comprising at least one concentric ring with respect to said axis 14. In correspondence with the axis 14, the disk plan 16 includes a through seat 18 of basically cylindrical form.

Around the external ring portion of disk plan 16 that forms the perimeter, are a set of pins 20, distributed at a uniform distance from each other, extending in a direction parallel to the rotation axis 14. These pins will be described further on as axial pins.

Figure 5:
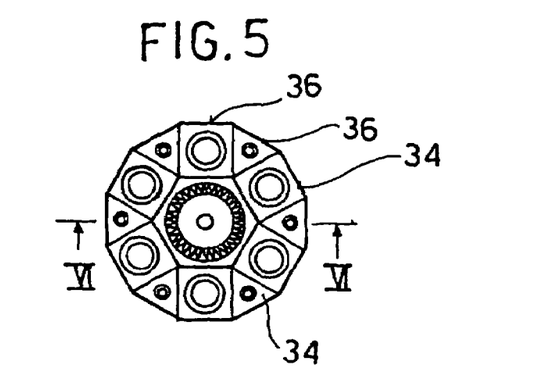
FIG. 5 illustrates a view from above of a possible embodiment of a detail shown in FIG. 1.
Figure 6:
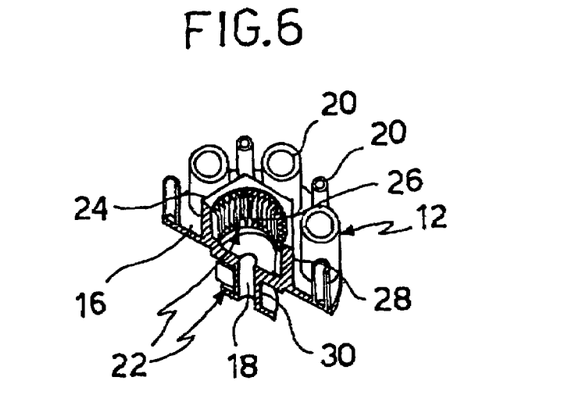
FIG. 6 illustrates a perspective partial cross section view taken along the line VI-VI of the detail shown in FIG. 5.
Figure 7:
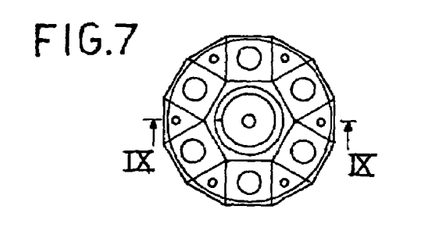
FIG. 7 illustrates a view from above of an embodiment of a detail shown in FIG. 1.
Figure 8:
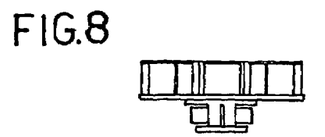
FIG. 8 illustrates a side view of a detail shown in FIG. 7.

In the example shown in FIG. 5 or 6 the axial pins are preferably variable in diameter. In particular a first set of pins has been foreseen with a larger diameter, and a second set of pins with a smaller diameter. Preferably the pins of one set alternate with the pins of the other set.

Moreover, the pins illustrated in FIG. 5 or 6 present a structure that is axially hollow.

Figure 9:
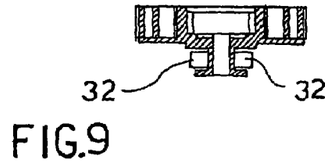
FIG. 9 illustrates a cross section view taken along the line IX-IX of the detail shown in FIG. 7.

A drum 12 also comprises means for stepwise rotation 22 in order to rotate each drum by a pre-determined angle compared to the drum immediately adjacent. A possible embodiment of the stepwise rotation means 22 is illustrated in FIG. 6 or 9 and provides that said stepwise rotation means 22 comprises a side wall 24 that extends from said plan 16 in a co-axial manner to the through seat 18 and to the longitudinal axis 14. This side wall 24 forms a cylindrical seat 26 co-axial with the through seat 18.

Advantageously, the internal surface of the side wall 24 presents a knurled portion with grooves and cogs formed in a direction parallel to the axis 14.

Extending from the part opposite plan 16 with respect to wall 24 is another cylindrical wall 30 that forms said through seat 18. Extending radially from the external side surface of said further cylindrical wall 30 are several ribs or small blades 32 that interact with the knurled portion 28 of the drum immediately adjacent.

Reference numeral 34 identifies in a general manner some inserts equipped with faces 36 carrying distinctive elements, such as, for example, alphanumeric characters, or graphical symbols or even colours. One of these faces 36 will be visible in the assembled device.

The inserts 34 can assume various configurations. In FIG. 5 the drum 12 is suitable for housing two types of inserts in alternating position. A first type of insert is a quadrangular based prism on which the four side faces each carry a distinctive element. A second type of insert is a triangular based prism on which each of the three side faces carries a distinctive element.

Preferably, the adjacent inserts mounted on the respective drums are in contact with each other so that their side faces touch and are therefore not visible from the outside of the device.

The inserts 34 are adapted to be connected in a releasable manner along the external side edge of each of the said drums 12, in other words, in correspondence of the annular portion of plan 16. In fact, each insert 34 has a seat 37 that is preferably cylindrical of a size suitable to house one of the axial pins 20. In particular, according to the example shown in FIG. 5, the pins with a larger diameter are designed to interact with the inserts having a quadrangular base, while the pins with a smaller diameter are intended for interacting with the triangular base inserts.

The corresponding pins and prisms are preferably shaped so that the prisms can be attached and detached from the pins with slight pressure.

Reference numeral 38 indicates a rod adapted to receive the drums 12 set next to each other in axial direction. In fact, the through seats 18 form a seat suited to receive the rod 38 so that it forms the axis 14 around which the drums rotate.

Preferably a stop 40 will be fixedly attached to one end of the rod 38. In the example illustrated in the figures, the first stop 40 is formed by a slightly convex disk with a radial extension equal to the radial extension of the drums.

Figure 3:
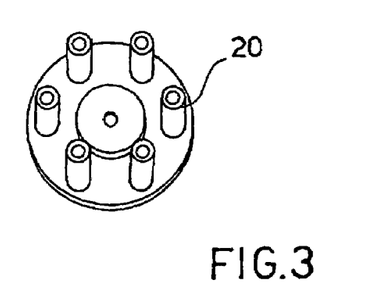
FIG. 3 illustrates an axonometric view of a possible embodiment of a detail shown in FIG. 1.
Figure 4:
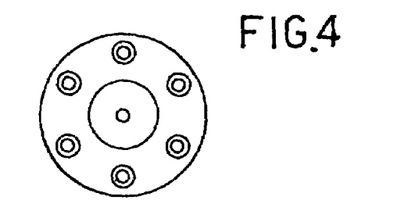
FIG. 4 illustrates a view from above of the detail shown in FIG. 3.

Moreover a second stop 42 is provided (FIGS. 3 and 4) for insertion on the rod 38 at the opposite end to that which is attached to the first stop 40. This stop is designed to be fixedly attached to the rod so that it blocks the drums axially. In the example illustrated in the figures, the second stop 42 has the same form as the first stop 40 and is inserted in the rod 38 in a specular manner.

A locking member 44 prevents the drums 12 and the second stop 42 from slipping from the rod. The drums are shaped so that they can be attached to as to permit an axial rotation, or detached from each other with slight pressure. The locking member 44 is in form of a cap which can be inserted, preferably with a snap action onto the free end of the rod.

According to a possible embodiment, the locking member 44 comprises a gripping device 46 that, in the examples shown in the figures, is composed of a ring that makes the device suitable for use as a key ring.

The assembly and the functional use of the device for automatic reading of a plurality of codes through a single key code illustrated previously and according to the present invention will be described further on.

Figure 10:
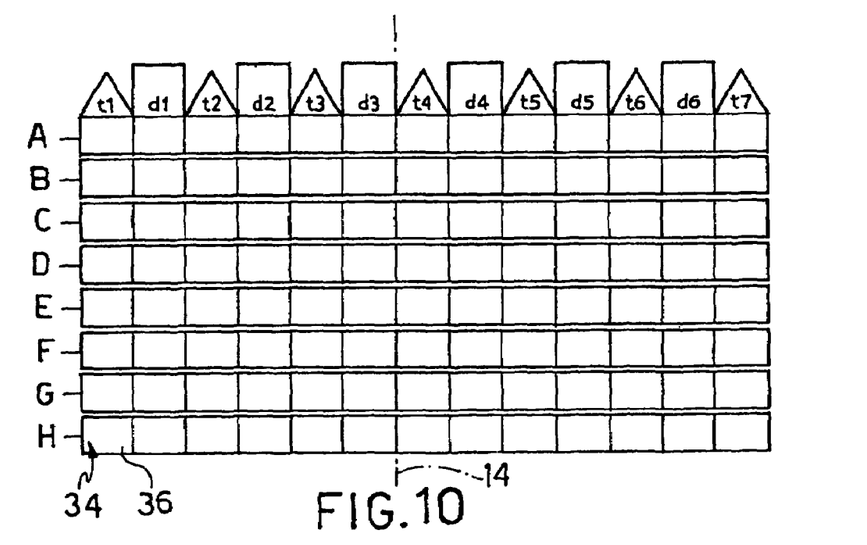
FIG. 10 illustrates a schematic diagram of the system shown in FIG. 1 that also corresponds with the layout of a possible embodiment of the device itself.
Figure 11:
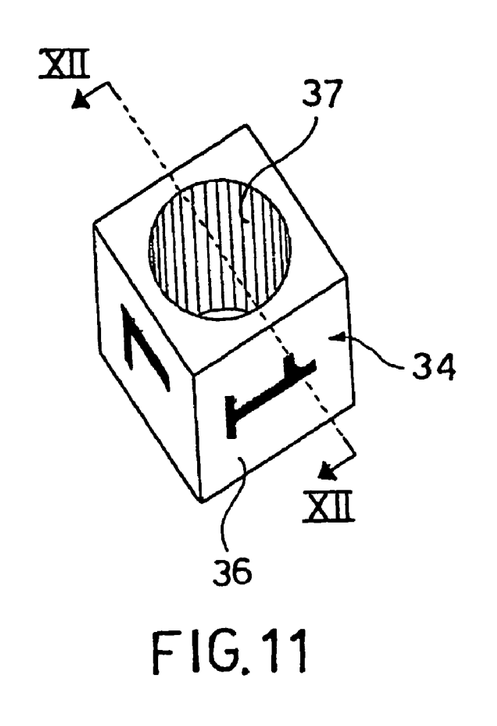
FIG. 11 illustrates an axonometric view of a detail of the system shown in FIG. 1.
Figure 12:
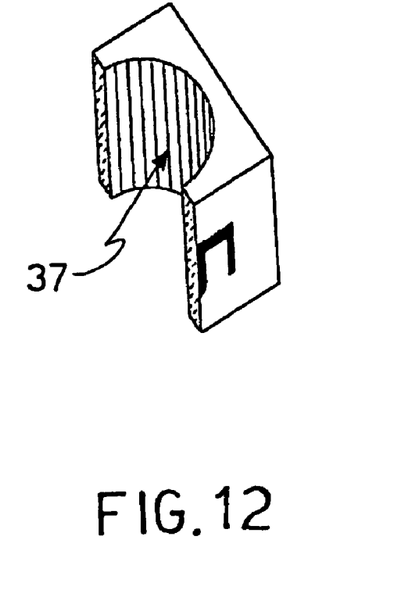
FIG. 12 illustrates the axonometric view of the detail shown in FIG. 11 in a cross section view taken along the line XII-XII shown in FIG. 11.

The inserts 34 are combined with the relative drums by choosing the insert and the respective visible face according to the key code and the codes to be remembered. FIG. 10 shows the linear development of the external edge of certain drums, or in other words, the sequence of the visible insert faces.

To simplify the description, the linear development of eight drums 12 for the embodiment of the device shown in FIG. 1 have been indicated with the letters A to H.

According to the example in FIG. 10, each drum comprises a triangular based insert alternated with a quadrangular based insert for a total of twelve inserts 34. The triangular based inserts are identified with the reference numbers t1 to t6 while the quadrangular based inserts are identified with numbers d1 to d6.

The drums 12, and in particular their linear development illustrated in FIG. 10 are positioned adjacently in a line parallel with axis 14 so that the distinctive elements of several drums are aligned.

In the case of triangular based inserts, the side faces are three in number and therefore it is possible to choose between three different distinctive elements in the case where these inserts are previously pre-molded and pre-engraved. This is identical for the quadrangular based inserts where there is a choice possibility among four different distinctive elements.

The development shown in FIG. 10 is an additional help for the composition of the drums 12 and therefore also for the choice of the inserts. Moreover, this figure also illustrates how the inserts 34 are combined with each other in a removable configuration so that they form a plurality of strings formed by the sequence of the visible faces of the inserts adjacent to each other, for example like those indicated in the rows A-H in FIG. 10.

The composition of each string is obtained by positioning both the key code and the code to be remembered in the transversal direction of the string itself, or in other words, in the axial direction in the case of the drums 12. In the example shown in FIG. 10, the column t1 could be used to show the key code, while the following columns d1, t2, d2, etc could be used to show the codes to be remembered (in the illustrated example this can include up to twelve codes for credit cards, bank distributor cards, mobile phone cards etc.)

Once the columns of figures have been completed as shown in FIG. 10, is immediately available each row A-H corresponding to a string, and therefore to the composition of a drum 12.

By following the diagram provided in FIG. 10 it is possible to choose the inserts to be used for each drum, to insert them in the respective axial pins 20, arranging them so that the distinctive element is visible on the external edge of the drum. Alternatively it is possible to use inserts where the distinctive element can be written or engraved directly, thus avoiding the need of having a prepared set of inserts.

When all the drums have been completed, they are inserted in sequence in the rod 38 so that they are adjacent to each other parallel to axis 14.

At the same time the stepwise rotation means 22 is assembled together as illustrated in the cross section portion in FIG. 1.

The second stop 42 and the locking member 44 are mounted to close the assembly.

Therefore the rod 38, the first stop 40, the second stop 42, and the locking member 44 are the means for positioning the strings alongside each other in parallel mode so that the distinctive elements of several strings are aligned in a direction that is essentially transversal to the direction of the string itself.

Through misaligning the columns t1-d6 by rotating the respective drums (in other words by making the strings A-H slide with respect to each other) it becomes impossible to read the interesting codes. There are $12^8$ possible combinations.

The secret codes that are read sideways between the strings are obtained automatically by rotating the drums (or by making the strings A-H slide with respect to each other) and lining up the distinctive elements of several strings/drums to form the key code along the transversal direction with respect to the direction of each string (i.e. corresponding with the direction parallel to the axis 14).

As described above it is easy to understand how a device such as that described in the present invention allows a user to access to a plurality of codes for credit cards, numerical locks, bank distributors, or similar codes by simply remembering one single code.

This is made possible thanks to a device that according to a possible embodiment can assume the form and size of a key ring, desk or computer accessory. They are particularly compact and lightweight, and can be made from any type of material from low cost to prestige materials.

A further advantage of the device as described in this invention is the absolute simplicity of the device structure, resulting in low production costs.

Of course other variants and/or additions can be applied to the embodiment described above.

The number, shape and size of the drum inserts and drums can also be varied in relation to the described and illustrated embodiment Moreover, the embodiment illustrated in FIG. 10 for example, could be used as a model for a device as described in this invention, manufactured in electronic form, where each insert is composed of a section on a display, which, using an appropriate program, could be aligned or misaligned in relation to the others. In this case, the concept of the removable insert could be applied using a writing system that allows the user to align several distinctive elements to form a string.

As an alternative to the example illustrated in FIG. 9, the stepwise rotation means can include at least one axial groove formed in one drum and designed to interact with at least one axial rib on a portion of the adjacent drum or the rod.

The inserts illustrated in the enclosed figures can be different in number, shape and size; for example, they can consist of cylindrical elements on which the side wall carries at least one distinctive element.

In particular, the inserts can be produced in mosaic tessera form for example, with a quadrangular base carrying a single distinctive element. These tesserae can be attached to the drums or other elements rotating around an axis in a direction perpendicular to the rotation axis with a snap-on locking system to prevent them from sliding off.

The system used to attach the inserts to the drum can also be different. In the case described above, the inserts are inserted into axial pins and maintained in axial direction by the interaction with the plan 16 of the adjacent drum and/or by a snap-on system that attaches the inserts and makes them easily movable with the application of slight pressure.

As an alternative the drums 12 can comprise radial pins designed for insertion in seats formed in the inserts. Moreover, locking systems can be envisaged of the snap-on type for example, to prevent the inserts from sliding off the pins and the drums from sliding off the adjacent drums.

In the FIGS. 13-33, the number 10 identifies another embodiment of the device for automatic reading of a plurality of codes by means of a single key code as described in this invention. The elements in common with the version already described are identified with their same reference numeral.

Figure 13:
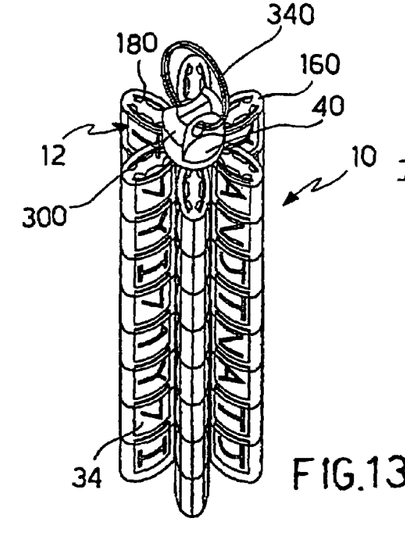
FIG. 13 illustrates a perspective view of a possible embodiment of the device according to the present invention.
Figure 14:
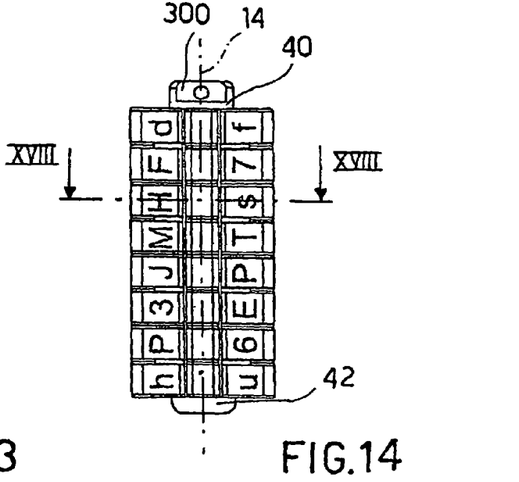
FIG. 14 illustrates a side view of the device shown in FIG. 1.

According to the embodiment example illustrated in FIG. 13, the device in question can, for example, assume the shape and size of a key ring or an accessory for application on a computer monitor, or an office desk, and can comprise a plurality of drums 12 designed to rotate around a longitudinal axis 14.

In the example in FIG. 1, eight drums are provided alongside each other in a direction parallel with axis 14.

Figure 15:
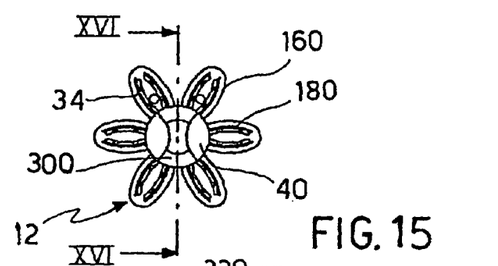
FIG. 15 illustrates the horizontal section of the device shown in FIG. 1.
Figure 16:
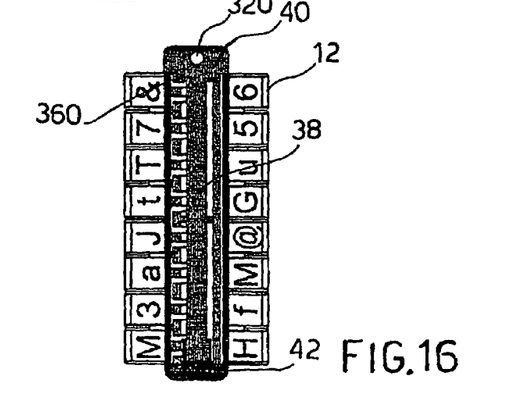
FIG. 16 illustrates a cross section view taken along the line XVI-XVI of the device shown in FIG. 15.
Figure 17:
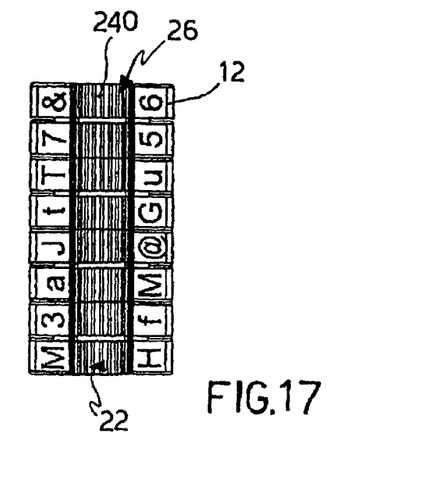
FIG. 17 illustrates a cross section view of FIG. 16 wherein certain details have been omitted to provide a clearer view of other details.
Figure 18:
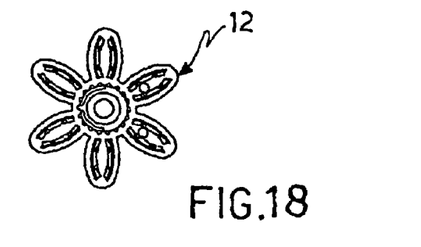
FIG. 18 illustrates a cross section view taken along the line XVIII-XVIII of the device shown in FIG. 14.
Figures 18A, 21, 22, 23, 24, 25, 26:
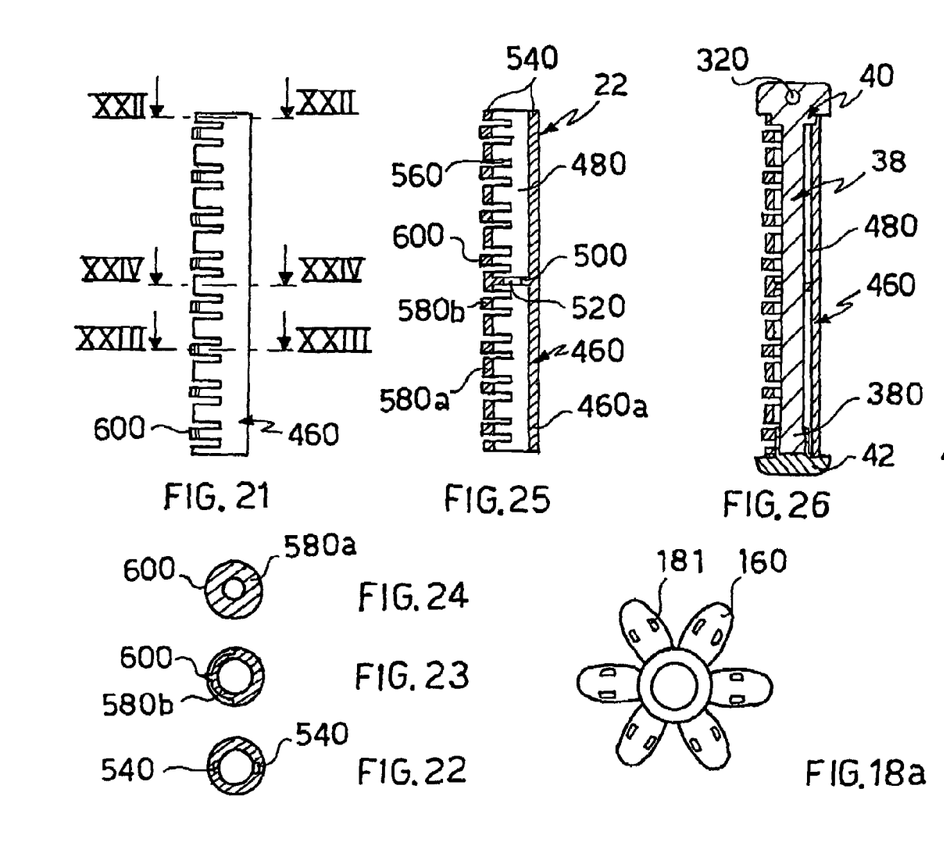
FIG. 18a illustrates a plan view of the device shown in FIG. 13 seen from underneath.
FIG. 21 illustrates a side view of a detail of the device shown in FIG. 13.
FIG. 22 illustrates a cross section view taken along the line XXII-XXII of the detail shown in FIG. 21.
FIG. 23 illustrates a cross section view taken along the line XXIII-XXIII of the detail shown in FIG. 21.
FIG. 24 illustrates a cross section view taken along the line XXIV-XXIV of the detail shown in FIG. 21.
FIG. 25 illustrates the cross section view of FIG. 16 where certain details have been omitted to provide a clearer view of other details.
FIG. 26 illustrates the cross section view of FIG. 16 where certain details have been omitted to provide a clearer view of other details.
Figures 19, 30:
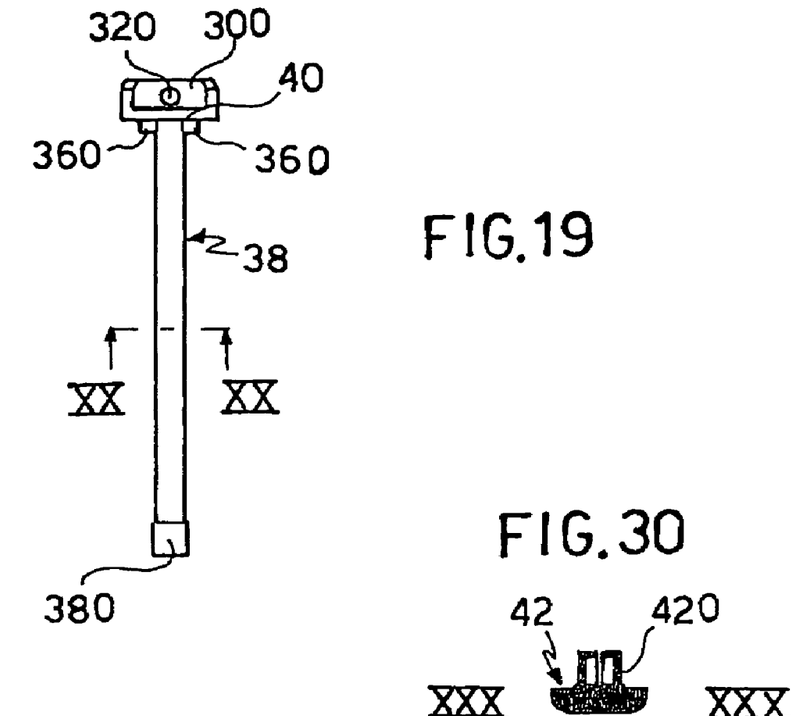
FIG. 19 illustrates a side view of a detail of the device shown in FIG. 13.
FIG. 30 illustrates a cross section taken along the line XXX-XXX of the detail shown in FIG. 29.
Figure 20:
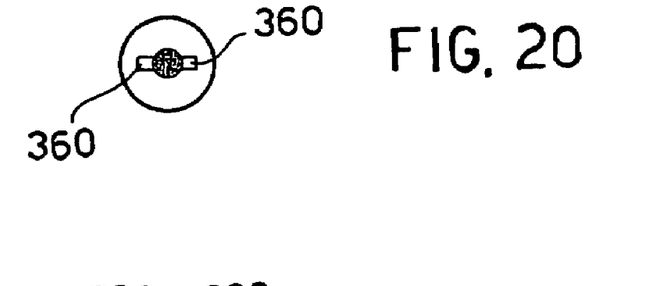
FIG. 20 illustrates a cross section view taken along the line XX-XX of the detail shown in FIG. 19.
Figure 27:
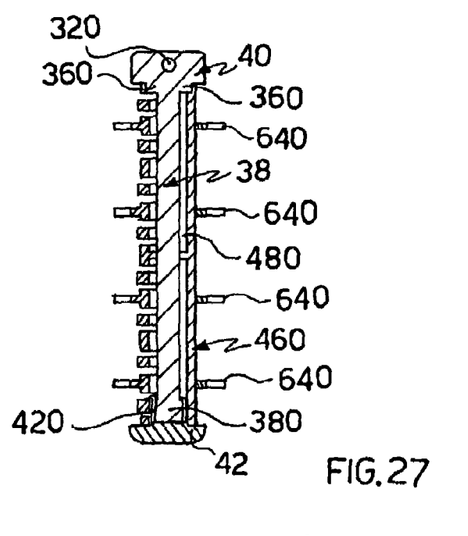
FIG. 27 illustrates the cross section view of FIG. 16 where certain details have been omitted to provide a clearer view of other details.
Figure 28:
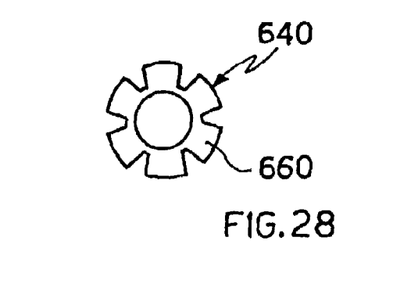
FIG. 28 illustrates a plan view of a detail of the device shown in FIG. 13.
Figure 29:
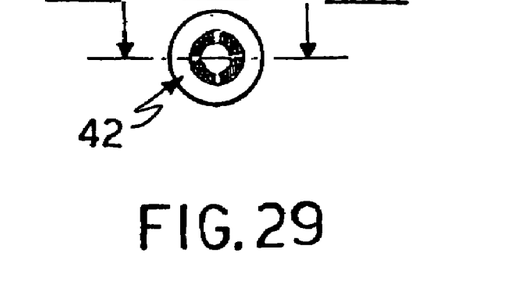
FIG. 29 illustrates a plan view of a detail of the device shown in FIG. 13.

An example of embodiment of a drum 12 is illustrated for example in FIGS. 13, 15, and 18, and includes a plurality of lobes 160. In the example illustrated, six lobes are provided for each drum. Two slots 180 are provided in each lobe 160, that pass through the drum in a direction that is basically parallel to axis 14. Each slot is adapted to receive an insert 34 equipped with at least one face carrying for example, a distinctive element, such as an alphanumeric character or a graphical symbol or colour visible inside the assembled device.

Each insert 34 is adapted to be connected in a removable manner to its respective drum inside slot 180. In a further possible embodiment, the inserts 34 are manufactured as sheets or plates suitable for insertion in the respective slots 180. The lobe 160 and therefore, the slot 180 has a lower closing wall wherein at least one opening 181 is formed for the insertion of an extractor, not illustrated, that is used to extract the inserts from the slot.

Each drum comprises a through seat 26 that is basically cylindrically-shaped and co-axial with axis 14. The seat 26 is bounded by a side wall of the respective drum carrying ribs 240 that run in a same direction parallel to axis 14. According to a possible embodiment, the ribs 240 are preferably distributed uniformly around the circumference.

The reference numeral 38 is referred to a rod designed to receive the drums 12 placed alongside each other in the direction of the axis. The through seats 26 form a seat adapted to receive this rod 38 so that it forms the axis 14 around which said drums rotate.

According to a possible embodiment, the rod 38 has a first stop 40 fixedly attached to one end of the rod. In the example illustrated in the figures, the first stop 40 has a disk form from which extends a shoulder 300 with a hole 320 being suitable for housing for example a ring 340 or some other attachment system that makes device 10 suitable for use as a key ring.

According to a possible embodiment, two fins 360 extend in a radial direction between the first stop 40 and the end of the rod 38, for example in diametrically opposite directions. The radial extension of the fins 360 is greater than the diameter of the rod 38.

The free end of the rod 38, in other words, the end opposite that one carrying the stop 40, forms a slight radially enlarged section 380.

The numeral 42 identifies a second stop that can be inserted on rod 38 on the end opposite to that one carrying the stop 40. This stop is adapted to be attached to the rod to block the drums axially.

According to a possible embodiment, the second stop 42 comprises a ring-shaped portion that extends radially to axially lock the drums 12 onto the rod. The numeral 420 indicates flexible fins that extend in the axial direction from the ring portion of the second stop 42. These fins are adapted to lodge the radially enlarged section 380 of rod 38.

Number 22 indicates the stepwise rotation means used to rotate each drum by a pre-determined angle with respect to the immediately adjacent drum and in relation to the rod 38. This means comprises the ribs 240 on the drums 12, and a specially shaped shaft 460 suitable for being inserted onto the rod 38, coaxially to the rod, and inside the drums 12.

The specially shaped shaft 460 is hollow, that is, it forms a through seat 480 adapted to receive the rod 38.

According to a possible embodiment, a baffle plate 500 is envisaged at a determined axial position of the specially shaped shaft 460. The baffle plate 500 includes a hole 520 with a radial extension that is less than that of the through seat 480 but in any case, suitable for lodging the rod 38, for example through a interference fit.

According to a possible embodiment, the numeral 540 refers to two slots set in axial direction for a certain portion of the side surface that forms the through seat 480 from one end of the specially shaped shaft 460. These slots are adapted to receive the fins 360 of the first stop 40.

The specially shaped shaft 460 is basically made of hollow cylindrical wall that comprises a complete first portion 460a that extends for approximately 180°, and a second portion 460b that bears several radial notches 560 that form a series of axial sectors with various shapes. The first axial sectors identified with number 580a have a basically semi-cylindrical shape as an extension of the first portion 460a. The second axial sectors identified with numeral 580b have a basically semi-cylindrical shape with a radius that is slightly smaller than axial sectors 580a, and include a tooth 600 that extends radially outside the radial dimensions of the first sectors 580a. Each tooth 600 is adapted to be lodged between two adjacent ribs 240 on a drum 12. The number of the second sectors 580b is foreseen as being the same as the number of drums 12 and each respective second sector is in alternate position with a respective first sector 580a. The specially shaped shaft 460 is manufactured in a material suitable to make the teeth 600 elastic and flexible.

According to a possible embodiment the number 640 indicates washers designed for insertion on the specially shaped shaft 460 in determined axial positions. According to a possible embodiment each washer 640 comprises a plurality of lobes 660 preferably the same number as the lobes 160 set on the drums 12 in the illustrated example in the figures. Four washers have been provided in the example illustrated in the figures.

Below is a description of the assembly and the method for using the device for automatic reading of a plurality of codes through a single key code as described previously.

The inserts are combined with the relative drums by choosing the insert and the respective visible face according to the key code and the codes to be remembered, as described in the previous example.

The specially shaped shaft 460 is co-axially inserted on the rod 38 so that the fins 360 are inserted into the slots 540. The mechanical coupling by insertion of the fins into the slots prevents the specially shaped shaft from rotating around the axis 14.

Then the first drum is positioned so as to abut against the first stop 40.

The tooth 600 of the respective axial sector is inserted between two adjacent ribs 240 of drum 12.

The following elements are positioned on the specially shaped shaft 46 in order: a washer 640, two more drums 12, a washer 640, two more drums 12, a washer 640, two more drums 12, a washer 640 and a final drum.

Lastly the second stop 42 is inserted so that the flexible fins 420 are blocked there where the rod 38 has the radially enlarged section 380.

Hence, the rod 38, the first stop 40, the second stop 42 with its flexible fins form means for aligning the strings (drums) in parallel mode so as to line up the distinctive elements of several strings in a direction that is essentially transversal to the direction of the string itself. Should the rod 38 be not envisaged, the stops can be directly mounted on the specially shaped shaft 460.

The inserts are positioned in a manner so that when the drums 12 are placed alongside, the inserts of the adjacent drums form columns in the axial direction. The inserts are inserted in the respective drums to form a string so that the first column that composes the key code corresponds with the adjacent columns that form the codes to be remembered. Therefore when the key code is composed in its respective column, the other strings will automatically form the codes to be remembered (Bank distributor, mobile phone etc.) On the other hand, when the drums are rotated and the inserts of the adjacent strings are misaligned, the codes to be remembered are not immediately readable.

Figure 31:
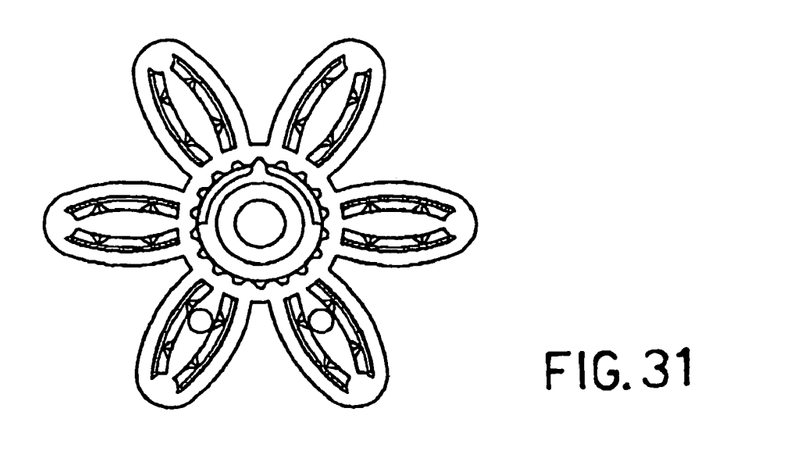
FIGS. 31-33 illustrate the device shown in FIG. 18 in different working conditions.
Figure 32:
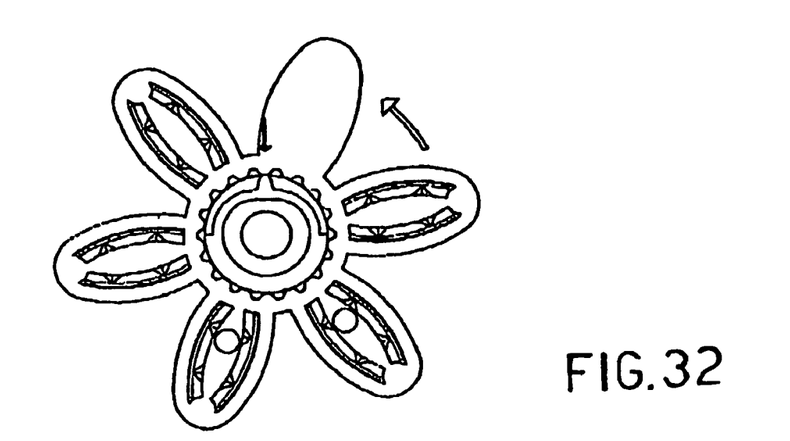
Figure 33:
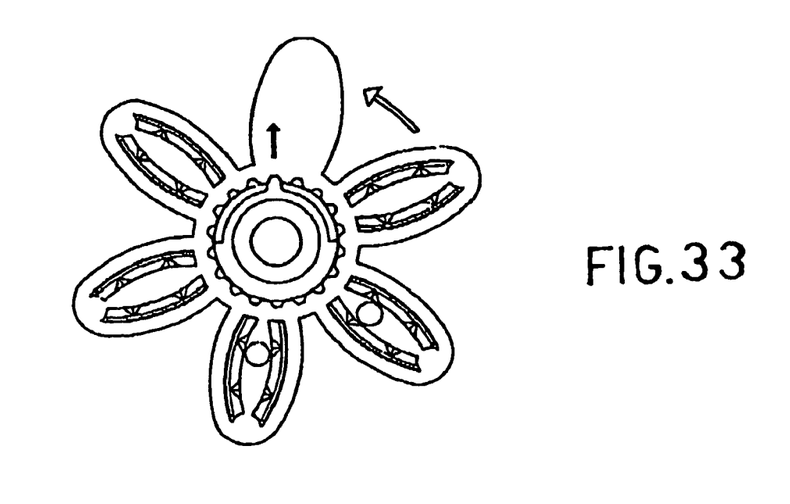

The device function mode during rotation is illustrated for example in FIGS. 31-33. In rest position (FIG. 31) the tooth 600 is inserted between two adjacent ribs 240.

When the respective drum is rotated, the tooth 600 is pushed radially inwards (FIG. 32) or it bends in a direction at a tangent to pass over the rib 240. As soon as the rib has been passed, the tooth returns resiliently to its original form (FIG. 33).

The provision of said stepwise rotation means allows a precision positioning of the drums to be achieved, while maintaining a simple compact structure at the same time.

It is clear that variants and/or additions to the above described and illustrated embodiments can be foreseen.

According to a possible embodiment a further stop can be provided at one end of the specially shaped shaft 460, for example such end where slots 540 are located. This further stop could take the form of a circular ring extending radially from the specially shaped shaft 460 and locking the drums 12 in place. This stop on the shaft 460 abuts against the first stop 40 on rod 38. In this case the drums can be easily arranged on the specially shaped shaft 460 even before the shaft is fitted on the rod 38.

According to a possible further embodiment the drums can be arranged alongside each other without the need for the insertion of the washers 640.

Figure 34:
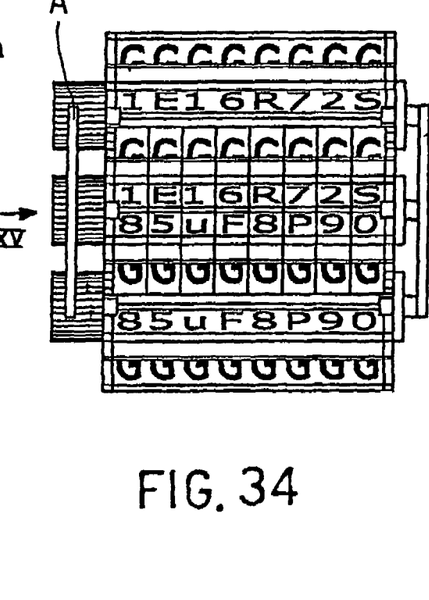
FIG. 34 illustrates a side view of a possible embodiment of a device according to the present invention.
Figure 35:
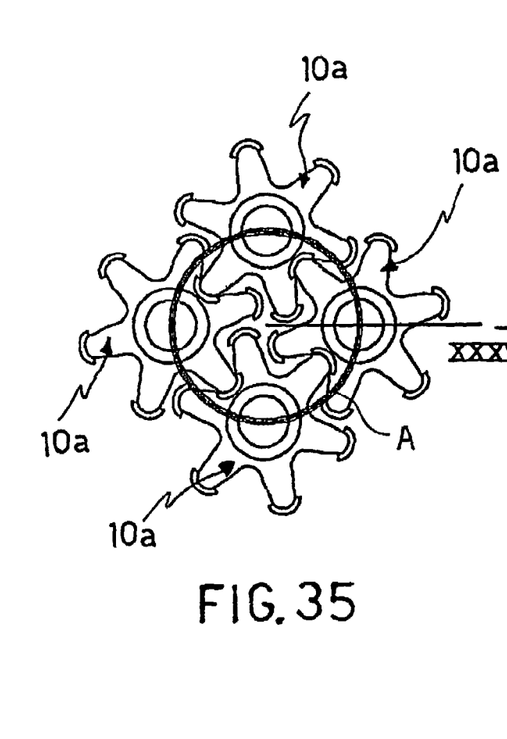
FIG. 35 illustrates a view of the area shown by arrow XXXV of the device shown in FIG. 34.
Figure 36:
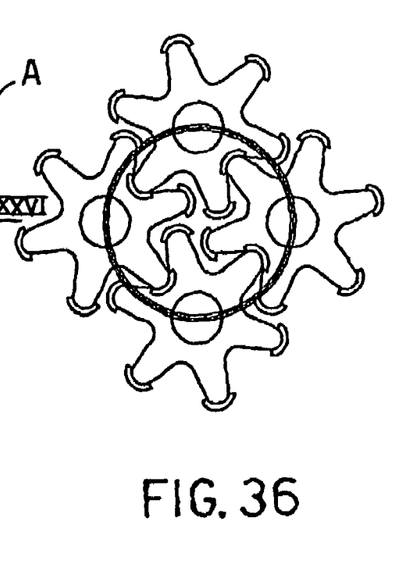
FIG. 36 illustrates a view of the area shown by arrow XXXVI of the device shown in FIG. 34.

The FIGS. 34-36 illustrate a possible embodiment of the device according to the present invention including four units 10*a* which have the same structure or a similar one to that of the previously described device 10. In particular, the drums of each unit comprise a plurality of lobes or teeth so that the lobes of one unit are inserted in the cavities between two lobes on the adjacent unit. Locking means are functionally associated to the ends of such units so to maintain them side by side but to allow their rotation around the respective longitudinal axis. Such means is composed for example of a ring A that connects the ends of unit 10*a*, for example through insertion in holes provided for this purpose.

Said variant is conceived to operate in a way so that the rotation of a respective drum of one unit will cause the rotation of the corresponding respective drum of the adjacent unit, as if they were two gear wheels meshing together.

The original provision of a plurality of units allows a larger number of possible combinations and therefore a larger number of codes to be achieved, that can be contained in the device.

Obviously the number of the units 10*a* and the respective lobes, their shape and the number of drums can vary with respect to the version described.

In all the variants described and/or illustrated, the number, shape and size of the drum inserts and the drums can vary with respect to the versions already described and illustrated. The number of lobes or the shape of the drum can also vary.

The system used to fix the insert to the drum can also be designed differently.

In the case where a specially shaped shaft is envisaged the rod can be omitted, using the shaft only.

Or a rod can be adopted with a square or cross-shaped cross-section.

In all the embodiments of the present invention, at least two drums (or at least two strings) can be provided, each one comprising at least two inserts.

In order to satisfy specific and associated needs, those skilled in the art will be able to modify, adapt and replace certain elements of the preferred above described embodiment of the device with functionally equivalent ones, while still remaining within the scope of the following claims.

What is claimed is:

1. Device for the automatic reading of a plurality of codes by means of a key code comprising:
   a plurality of inserts having at least one visible face suitable for carrying distinctive elements, said inserts being combined in a movable manner, so that the distinctive elements applied to at least one visible face of every insert form a plurality of strings,
   means for positioning said strings alongside each other in parallel mode so as to align the distinctive elements of several strings according to a direction that is substantially transversal with respect to the direction of the strings, the first distinctive elements of each string forming the key code, the second distinctive elements of each string forming a code to be remembered, and wherein the $N^{th}$ distinctive element of each string forms the $N^{th}$ code to be remembered, and
   means for varying the relative position between at least two strings from the initial configuration, wherein when the key code is formed it is possible to read the other codes on the strings in transversal direction, to a position in which the distinctive elements of at least one string appear misaligned compared to the distinctive elements of the other strings.

2. Device for the automatic reading of a plurality of codes by means of a key code as described in claim 1, comprising:
   a plurality of drums designed to rotate around an axis and said plurality of inserts having visible faces carrying distinctive elements, said inserts being connected in a movable manner along the side edge of each of said drums to form said strings,
   wherein said drums can be adjacently positioned in an axial direction in order to align the distinctive elements of the plurality of drums.

3. Device for the automatic reading of a plurality of codes by means of a key code according to claim 2 wherein said drums comprise at least one axial pin designed for insertion in a seat formed in one of said inserts.

4. Device for the automatic reading of a plurality of codes by means of a key code according to claim 3, wherein said at least one axial or radial pin includes a snap-on locking means to prevent said inserts from slipping out of position.

5. Device for the automatic reading of a plurality of codes by means of a key code according to claim 2, wherein said drums include at least one radial pin adapted to be inserted in a seat formed in one of said inserts.

6. Device for the automatic reading of a plurality of codes by means of a key code according to claim 5, wherein said at least one axial or radial pin includes a snap-on locking means to prevent said inserts from slipping out of position.

7. Device for the automatic reading of a plurality of codes by means of a key code according to claim 2, wherein at least one of said inserts is a quadrangular based prism, each of the side faces carrying a distinctive element.

8. Device for the automatic reading of a plurality of codes by means of a key code according to claim 2, wherein at least one of said inserts is a cylindrical element whose side wall carries at least one distinctive element.

9. Device for the automatic reading of a plurality of codes by means of a key code according to claim 2, wherein at least one of said inserts is a triangular based prism, each one of the side faces carrying a distinctive element.

10. Device for the automatic reading of a plurality of codes by means of a key code according to claims 7 or 9 wherein said drums comprise quadrangular prism inserts alternating with triangular based prism inserts.

11. Device for the automatic reading of a plurality of codes by means of a key code according to claim 2, wherein said drums comprise at least one slot adapted to receive an insert.

12. Device for the automatic reading of a plurality of codes by means of a key code according to claim 11, wherein at least one of said slots extends inside the drum in a direction that is substantially parallel to the said axis.

13. Device for the automatic reading of a plurality of codes by means of a key code according to claim 12, wherein said inserts are manufactured as a sheet or plate material suitable for insertion in the respective slots.

14. Device for the automatic reading of a plurality of codes by means of a key code according to claim 11, wherein said inserts are manufactured as a sheet or plate material suitable for insertion in the respective slots.

15. Device for the automatic reading of a plurality of codes by means of a key code according to claim 2, wherein at least one of said drums includes at least one lobe.

16. Device for the automatic reading of a plurality of codes by means of a key code according to claim 15, wherein at least one of said drums includes a plurality of lobes.

17. Device for the automatic reading of a plurality of codes by means of a key code according to claim 16 wherein each lobe has at least one slot, adapted to receive an insert.

18. Device for the automatic reading of a plurality of codes by means of a key code according to claim 16, wherein each lobe has two slots, each one suitable for receiving an insert.

19. Device for the automatic reading of a plurality of codes by means of a key code according to claim 15 wherein each lobe has at least one slot, adapted to receive an insert.

20. Device for the automatic reading of a plurality of codes by means of a key code according to claim 15, wherein each lobe has two slots, each one suitable for receiving an insert.

21. Device for the automatic reading of a plurality of codes by means of a key code according to claim 2, wherein a rod is provided that is suitable for receiving said drums positioned adjacently in an axial direction, said drums possessing a through seat to receive said rod.

22. Device for the automatic reading of a plurality of codes by means of a key code according to claim 21, wherein said rod comprises a first stop fixedly attached to one end of the rod itself.

23. Device for the automatic reading of a plurality of codes by means of a key code according to claim 22, wherein said first stop has a radial extension equal to the radial extension of the drums.

24. Device for the automatic reading of a plurality of codes by means of a key code according to claim 23, wherein said rod comprises a second stop that can be inserted onto the opposite end of the rod from said first stop and is adapted to be fixed to the rod itself.

25. Device for the automatic reading of a plurality of codes by means of a key code according to claim 22, wherein said rod comprises a second stop that can be inserted onto the opposite end of the rod from said first stop and is adapted to be fixed to the rod itself.

26. Device for the automatic reading of a plurality of codes by means of a key code according to claim 25, wherein a locking member is provided to prevent said drums and said second stop from slipping from their position.

27. Device for the automatic reading of a plurality of codes by means of a key code according to claim 25, wherein said second stop comprises flexible fins designed to be attached to one end of the rod.

28. Device for the automatic reading of a plurality of codes by means of a key code according to claim 2, wherein step-wise rotation means are provided to rotate each drum by a pre-determined angle.

29. Device for the automatic reading of a plurality of codes by means of a key code according to claim 28, wherein said drums comprise a hollow cylindrical seat co-axial with said longitudinal axis and a side wall with at least one axial groove adapted to interact with axial ribs or blades formed on a portion of the adjacent drum.

30. Device for the automatic reading of a plurality of codes by means of a key code according to claim 28, wherein said drums include a hollow cylindrical seat that is coaxial with said longitudinal axis, and including a side wall with at least one knurled axial portion adapted to interact with axial ribs or blades on a portion of the adjacent drum.

31. Device for the automatic reading of a plurality of codes by means of a key code according to claim 28, wherein said drums include a hollow cylindrical seat that is co-axial with said longitudinal axis and including a side wall with at least one axial groove adapted to interact with axial ribs on a rod.

32. Device for the automatic reading of a plurality of codes by means of a key code according to claim 28, wherein said stepwise rotation means comprise a specially shaped shaft on which said drums are mounted, said shaped shaft comprising at least one tooth suitable for insertion between two grooves in a through seat formed in at least one of the said drums.

33. Device for the automatic reading of a plurality of codes by means of a key code according to claim 32, wherein said specially shaped shaft is manufactured from a resiliently conformable material that is flexibly movable during the rotation of drums around said axis.

34. Device for the automatic reading of a plurality of codes by means of a key code according to claim 33, wherein said specially shaped shaft includes a first portion consisting of a complete wall and a second portion provided with incisions that form at least two axial sectors.

35. Device for the automatic reading of a plurality of codes by means of a key code according to claim 33, wherein said specially shaped shaft comprises a first portion consisting of a complete wall and a second portion with incisions that form a series in sequence of axial sectors.

36. Device for the automatic reading of a plurality of codes by means of a key code according to claim 32, wherein said specially shaped shaft includes a first portion consisting of a complete wall and a second portion provided with incisions that form at least two axial sectors.

37. Device for the automatic reading of a plurality of codes by means of a key code according to claim 36, wherein at least one of the said axial sectors comprises said at least one tooth.

38. Device for the automatic reading of a plurality of codes by means of a key code according to claim 36, wherein at least a first axial sector has an essentially semi-cylindrical shape as an extension of the first portion.

39. Device for the automatic reading of a plurality of codes by means of a key code according to claim 38, wherein at least a second axial sector has an essentially semi-cylindrical shape with a radius slightly smaller than at least one said first axial sector.

40. Device for the automatic reading of a plurality of codes by means of a key code according to claim 39, wherein said at least one second axial sector includes said at least one tooth that extends radially further beside the radial dimension of said at least one first axial sector.

41. Device for the automatic reading of a plurality of codes by means of a key code according to claim 32, wherein said specially shaped shaft comprises a first portion consisting of a complete wall and a second portion with incisions that form a series in sequence of axial sectors.

42. Device for the automatic reading of a plurality of codes by means of a key code according to claim 41, wherein at least one of the said axial sectors comprises said at least one tooth.

43. Device for the automatic reading of a plurality of codes by means of a key code according to claim 32, wherein said specially shaped shaft is hollow and has a seat that is co-axial with said axis.

44. Device for the automatic reading of a plurality of codes by means of a key code according to claim 43, wherein said specially shaped hollow shaft is adapted to house a rod.

45. Device for the automatic reading of a plurality of codes by means of a key code according to claim 44, wherein said specially shaped shaft includes a baffle plate provided at a determined axial position within the seat of the specially shaped shaft and provided with a hole with a radial extension adapted to house the rod.

46. Device for the automatic reading of a plurality of codes by means of a key code according to claim 45, wherein said specially shaped shaft includes two slots that extend in the axial direction and are suitable for receiving fins attached to the rod.

47. Device for the automatic reading of a plurality of codes by means of a key code according to claim 44, wherein said specially shaped shaft includes two slots that extend in the axial direction and are suitable for receiving fins attached to the rod.

48. Device for the automatic reading of a plurality of codes by means of a key code according to claim 2, wherein washers are provided for insertion between two adjacent drums.

49. Device for the automatic reading of a plurality of codes by means of a key code according to claim 2, wherein at least one of said inserts includes a tessera that is fixed to the respective drum in a direction perpendicular to the rotation axis.

50. Device for the automatic reading of a plurality of codes by means of a key code according to claim 49, wherein said at least one insert is fixed to the respective drum through a snap-on locking system, to prevent the elements from sliding from their position.

51. Device for the automatic reading of a plurality of codes by means of a key code according to claim 2, wherein at least two units are provided, which are adjacent to one another and include a plurality of drums having lobes or teeth, the lobes of one unit meshing with the lobes of the adjacent units.

52. Device for the automatic reading of a plurality of codes by means of a key code according to claim 51, wherein locking means are operatively associated to the ends of the units to maintain them in the radial direction position.

53. Device for the automatic reading of a plurality of codes by means of a key code according to claim 1 wherein at least one of said inserts carries pre-printed distinctive elements.

54. Device for the automatic reading of a plurality of codes by means of a key code according to claim 1, wherein at least one of said inserts has at least one visible face suitable for writing or engraving said distinctive elements.

55. Device for the automatic reading of a plurality of codes by means of a key code according to claim 1, wherein said inserts are manufactured in the form of sections on a display adapted to be aligned or misaligned in relation to one another.

\* \* \* \* \*